United States Patent
Tsukada et al.

(10) Patent No.: US 6,938,492 B2
(45) Date of Patent: Sep. 6, 2005

(54) PRESSURE SENSOR AND MANUFACTURING METHOD OF PRESSURE SENSOR

(75) Inventors: Masao Tsukada, Atsugi (JP); Koichi Kusuyama, Atsugi (JP)

(73) Assignee: Hitachi Ltd., Kanagawa (JP)

( * ) Notice: Subject to any disclaimer, the term of this patent is extended or adjusted under 35 U.S.C. 154(b) by 3 days.

(21) Appl. No.: 10/429,856

(22) Filed: May 6, 2003

(65) Prior Publication Data

US 2003/0213308 A1 Nov. 20, 2003

(30) Foreign Application Priority Data

May 14, 2002 (JP) ........................................ 2002-138032

(51) Int. Cl.$^7$ ................................................ G01L 9/00
(52) U.S. Cl. ............................................ 73/753; 29/592
(58) Field of Search ..................... 73/700, 724, 729.1, 73/796; 29/592

(56) References Cited

U.S. PATENT DOCUMENTS

| | | | | | |
|---|---|---|---|---|---|
| 5,673,759 | A | * | 10/1997 | Biek | ........................... 173/178 |
| 6,058,781 | A | * | 5/2000 | Kusuyama et al. | ........... 73/724 |
| 6,250,152 | B1 | * | 6/2001 | Klein et al. | ............... 73/304 C |
| 6,446,510 | B1 | * | 9/2002 | Kurtz et al. | ................... 73/796 |
| 6,755,084 | B2 | * | 6/2004 | Tsukada et al. | ................ 73/724 |
| 2004/0182166 | A1 | * | 9/2004 | Jones et al. | ................ 73/729.1 |

FOREIGN PATENT DOCUMENTS

JP 11-118642 A 4/1999

* cited by examiner

Primary Examiner—Edward Lefkowitz
Assistant Examiner—Andre Allen
(74) Attorney, Agent, or Firm—Sughrue Mion, PLLC

(57) ABSTRACT

A bonding pad for outputting an output of a piezoresistive element to an integrated circuit is disposed on one side of a sensor substrate, and the sensor substrate is adhered to a package at only a rear side of the bonding pad.

11 Claims, 2 Drawing Sheets

PRESSURE SENSOR AND MANUFACTURING METHOD OF PRESSURE SENSOR

(1) FIELD OF THE INVENTION

The present invention relates to a pressure sensor suitable for detecting a fluid pressure and a manufacturing method thereof.

(2) RELATED ART OF THE INVENTION

Heretofore, there has been known a pressure sensor as disclosed in Japanese Unexamined Patent Publication No. 11-118642, as a pressure sensor that detects a fluid pressure.

In such a pressure sensor, a standard pressure chamber is provided on a surface side of a sensor substrate, and at the same time, a recess that receives a fluid pressure is formed on a rear face side of the sensor substrate.

Then, deflection of the sensor substrate caused by a differential pressure between a standard pressure and the fluid pressure is detected by a piezoresistive element.

However, in the case where the pressure sensor described above is mounted to a package, due to a difference between a thermal expansion coefficient of a sensor element and that of the package, a sensor output is changed depending on a change in environmental temperature.

SUMMARY OF THE INVENTION

Therefore, the present invention has an object to provide a mounting structure of a pressure sensor that is capable of suppressing a change in sensor output due to a change in environmental temperature, to a package, and a manufacturing method of the pressure sensor.

In order to achieve the above object, the present invention is constituted so that a rear face, that is capable to be adhered to a package, of a sensor substrate is partially adhered to the package.

The other objects and features of this invention will become understood from the following description with reference to the accompanying drawings.

PREFERRED EMBODIMENTS

Figure 1:
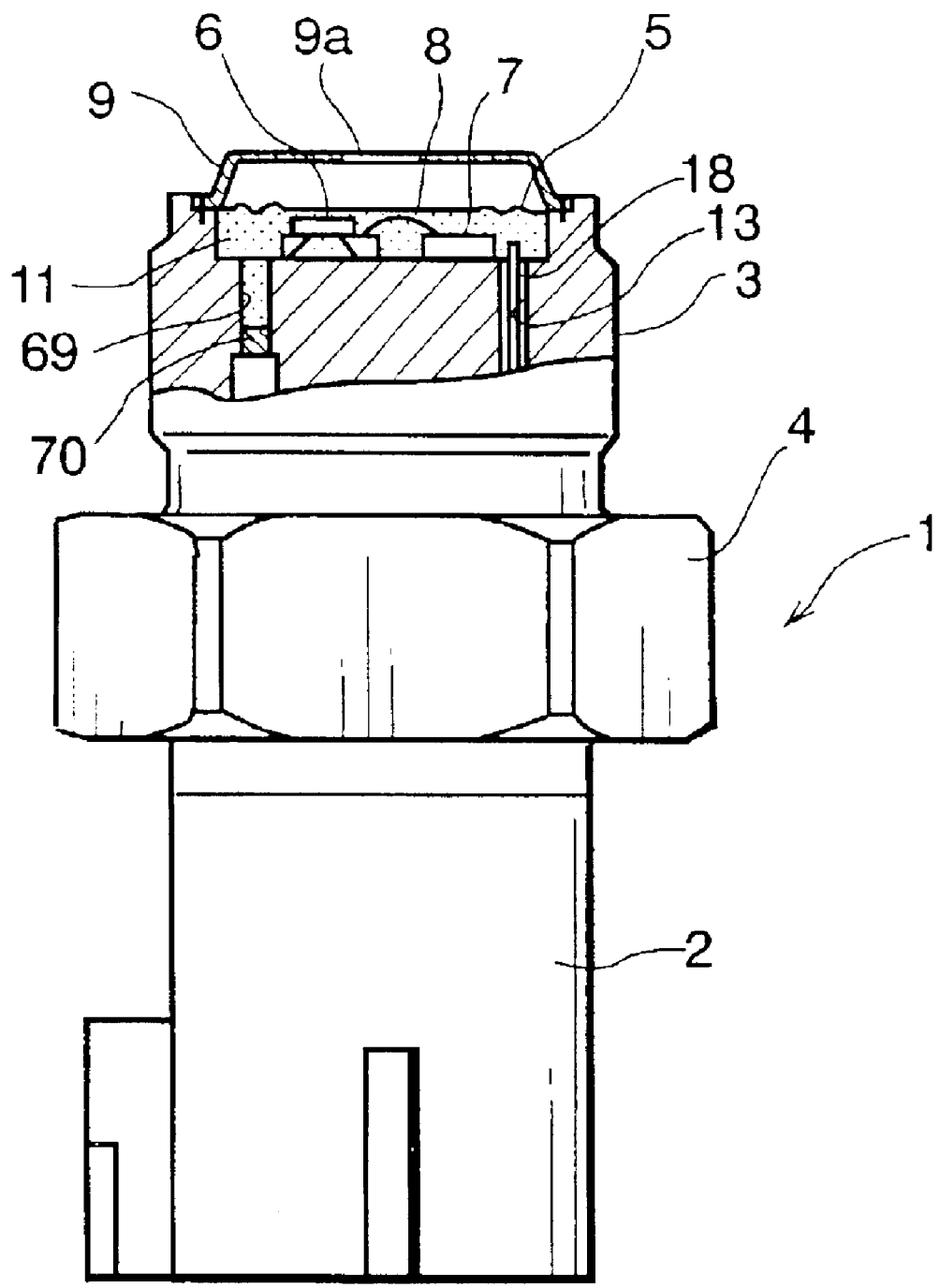
FIG. 1 is a diagram showing a package for a pressure sensor.

FIG. 1 shows a package for a pressure sensor.

In FIG. 1, a connector 2 for taking a sensor output is formed on a base end of a cylindrical package 1, and a mounting male screw 3 is formed on an outer periphery of a tip end of package 1.

Further, a hex-head screw 4 for fastening male screw 3 is disposed between connector 2 and male screw 3.

Moreover, a recess 5 is formed on the tip end of package 1.

Then, a sensor element 6 and an IC (integrated circuit) 7 performing a signal processing are mounted on a bottom face of recess 5.

Internal space of recess 5 is blocked by a diaphragm 8, and is filled with silicon oil 11.

A protector 9 is connected to the tip end of package 1 by welding, and diaphragm 8 is covered with protector 9 at a surface side thereof.

Protector 9 is formed with an opening 9a, and fluid is introduced into protector 9 via opening 9a.

A pressure of fluid introduced into protector 9 is transferred to silicon oil 11 via diaphragm 8, and a pressure of silicon oil 11 is detected by sensor element 6.

Then, an output from sensor element 6 is processed by IC 7, and an output signal from IC 7 is output to the outside via connector 2.

Figure 2:
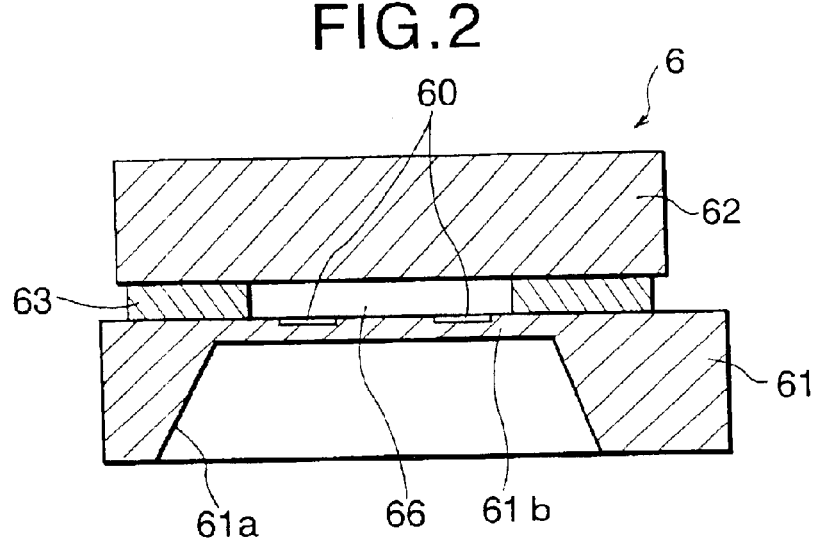
FIG. 2 is an enlarged sectional view of the pressure sensor.

FIG. 2 shows an enlarged diagram of sensor element 6.

Sensor element 6 comprises a piezoresistive element (detecting element) 60, a sensor substrate 61, a blocking plate 62 and a spacer 63, as shown in FIG. 2.

A recess 61a is formed on a rear face side of sensor substrate 61, to form a thin portion 61b.

Blocking plate 62 is laid on a surface side of thin portion 61b via spacer 63, to form a standard pressure chamber 66 which is surrounded by thin portion 61b, spacer 63 and blocking plate 62.

Piezoresistive element 60 detecting deflection of thin portion 61a is formed on a face of thin portion 61b at the standard pressure chamber 66 side.

Thin portion 61b is deflected depending on a differential pressure between a pressure at a recess 61a side and a pressure of standard pressure chamber 66, and this deflection is detected by piezoresistive element 60.

Figure 3:
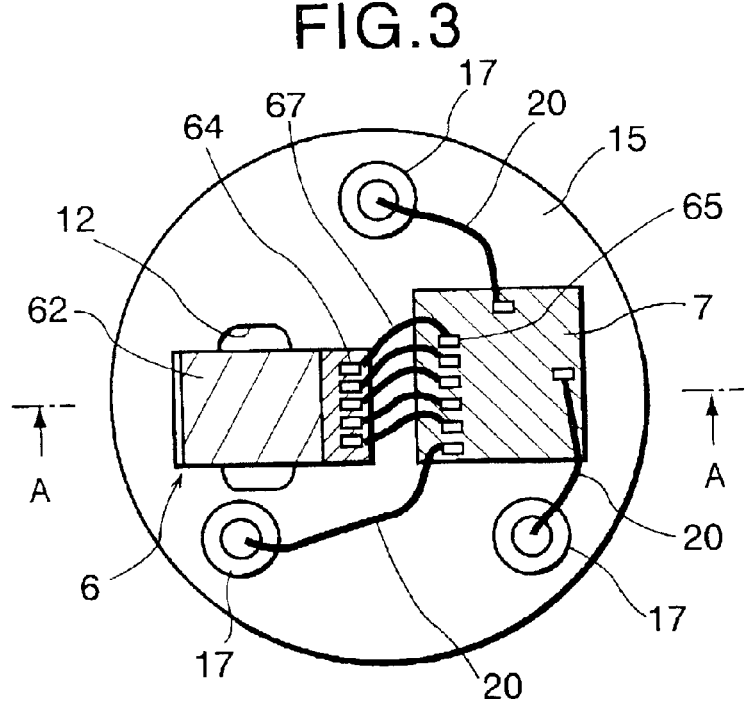
FIG. 3 is a top plane view showing a mounting structure of the pressure sensor and an IC to the package.
Figure 4:
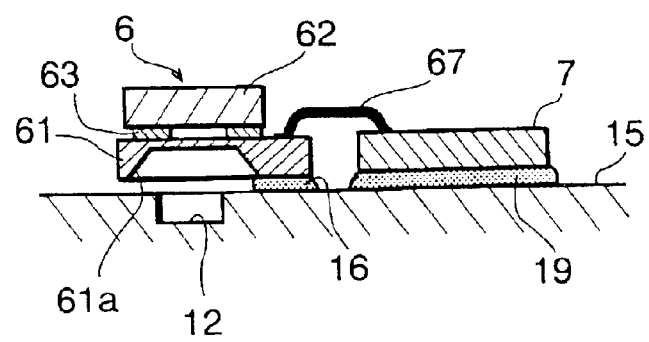
FIG. 4 is a sectional view along A—A in FIG. 3.

FIGS. 3 and 4 show a mounting structure of sensor element 6 and IC 7 to package 1.

A bonding pad 64 is disposed on one side at the surface side of sensor substrate 61.

Then, wires 67 connect between bonding pad 64 and lead electrodes 65 at IC 7 side.

Sensor element 6 is mounted on package 1 by adhering sensor substrate 61 with adhesive 16 to a circular mounting face 15 of package 1.

Here, sensor substrate 61 is adhered to mounting face 15, so that one side of sensor substrate 61, on which bonding pad 64 is disposed, is positioned at a center of mounting face 15 in a radial direction.

Further, the adhesion of sensor element 6 (sensor substrate 61) to mounting face 15 is performed at only one side on which bonding pad 64 is disposed.

Namely, sensor substrate 61 that is capable to be adhered to package 1 is not adhered to package 1 at the entirety of rear face thereof, but is adhered to package 1 at the side on which bonding pad is disposed, being a part of the rear face.

Accordingly, sensor element 6 is fixed to package 1 by adhesive 16 in a cantilever state.

Here, it is preferable that an adhesion area of sensor element 6 (sensor substrate 61) to mounting face 15 is equal to or less than a half of the area capable to be adhered of sensor substrate 61.

A recess 12 for communicating recess 61a of sensor substrate 61 with the space blocked by diaphragm 8 is formed on mounting face 15.

Recess 12 is disposed in parallel to the one side on which bonding pad 64 is disposed, and has the length longer than this one side, and also has the width narrower than one side of an open end of recess 61a.

On the other hand, IC 7 is disposed on a position facing sensor element 6 with the center of mounting face 15 therebetween, and the entirety of rear face of IC 7 is adhered to mounting face 15.

A signal line 20 from IC 7 is connected to a terminal 17 formed on mounting face 15.

As shown in FIG. 1, a hole 13 for signal line is formed on package 1, so that terminal 17 is connected to connector 2 by a wire 18 passing through hole 13.

Wire 18 is sealed within hole 13 by glass.

Moreover, in FIG. 1, an injection hole to be used for filling silicon oil 11 is denoted by numeral 69, and is blocked by a plug 70.

According to the above constitution, since the adhesion area between sensor substrate 61 and mounting face 15 is small, a stress caused due to a difference between a thermal expansion coefficient of sensor element 6 and that of package 1 becomes smaller, thereby enabling to suppress a change in sensor output depending on a change in environmental temperature.

Further, since bonding pad 64 is disposed on only one side of sensor substrate 61, a portion to be adhered can be limited to one side on which bonding pad 64 is disposed, thereby capable of more effectively making the adhesion area to be small.

Furthermore, since the adhesion area of sensor element 6 is small, and further, the adhered portion is disposed in the vicinity of the center of package 1, it is possible to reduce an influence of a fastening torque of package 1 on sensor element 6.

Consequently, it is possible to reduce a change in sensor output due to a variation in fastening torque.

Note, in the above embodiment, the constitution has been such that sensor substrate 61 is adhered to mounting face 15 at only one side. However, the constitution may be such that sensor substrate 61 is adhered to mounting face 15 at a plurality of portions.

However, it is preferable that the total area of the plurality of adhesion portions is equal to or less than a half of the area capable to be adhered, of sensor substrate 61.

The entire contents of Japanese Patent Application No. 2002-138032, filed May 14, 2002, a priority of which is claimed, are incorporated herein by reference.

While only selected embodiment has been chosen to illustrate the present invention, it will be apparent to those skilled in the art from this disclosure that various change and modification can be made herein without departing from the scope of the invention as defined in the appended claims.

Furthermore, the foregoing description of the embodiment according to the present invention is provided for illustration only, and not for the purpose of limiting the invention as defined by the appended claims and their equivalents.

What is claimed are:

1. A pressure sensor comprising:
   a detecting element;
   a sensor substrate, having a front face on which said detecting element is set and an opposite rear face; and
   a package to which said sensor substrate is adhered,
      wherein a bonding pad for outputting a signal from said detecting element is disposed on only one side of said front face of said sensor substrate, and a portion of said rear face of said sensor substrate, which is opposite said bonding pad disposed on the one side of said front face of said sensor substrate, is adhered to said package.

2. A pressure sensor according to claim 1,
   wherein said sensor substrate is adhered to said package by an area equal to or less than a half of said rear face, that is capable to be adhered to said package, of said sensor substrate.

3. A pressure sensor according to claim 1,
   wherein said detecting element is a piezoresistive element.

4. A pressure sensor according to claim 1,
   wherein a standard pressure chamber is disposed on said front face of said sensor substrate, and also a recess is formed on said rear face of sensor substrate, and deflection of said sensor substrate caused by a differential pressure between a pressure of fluid introduced into said recess and a pressure of said standard pressure chamber is detected, to detect the pressure of said fluid.

5. A pressure sensor according to claim 4,
   wherein a second recess is formed on a mounting face for said sensor substrate, of said package, to introduce fluid via said second recess into said recess on said rear face side of said sensor substrate.

6. A pressure sensor according to claim 1,
   wherein said detecting element and said sensor substrate are disposed within space blocked by a diaphragm, and also oil is filled in said space, and a pressure of said oil that is changed due to deflection of said diaphragm is detected, to detect a pressure of fluid with which said diaphragm contacts.

7. A pressure sensor according to claim 1,
   wherein an integrated circuit processing an output of said detecting element is adhered to said package together with said sensor substrate.

8. A pressure sensor comprising:
   a sensor substrate disposed with a recess on a rear face thereof;
   a blocking plate laid on a front face of said sensor substrate to form a standard pressure chamber;
   a detecting element detecting deflection of a bottom wall of said recess;
   an integrated circuit processing a detection signal of said detecting element; and
   a package to which said sensor substrate and said integrated circuit are adhered,
   wherein a bonding pad for outputting the detection signal of said detecting element is disposed on one side of side said front face of said sensor substrate, and at the same time, lead electrodes are disposed on said integrated circuit, to connect said bonding pad to said lead electrodes by wires; and
   a portion of said rear face of said sensor substrate, which is opposite said bonding pad disposed on the one side of said front face of said sensor substrate, is adhered to a center of said package.

9. A manufacturing method of a pressure sensor recited in claim 1, comprising the steps of:
   forming a bonding pad for outputting a detection signal of a detecting element to one side of a front face of a sensor substrate;
   adhering to a package a portion of said rear face of said sensor substrate, which is opposite said bonding pad disposed on the one side of said front face of said sensor substrate;

forming lead electrodes on an integrated circuit processing the detection signal of said detection element;

adhering said integrated circuit to said package; and connecting said bonding pad to said lead electrodes by wires.

10. A manufacturing method of a pressure sensor according to claim 9, wherein said step of adhering said sensor substrate to said package;

adheres to a center of said package, said portion of said rear face of said sensor substrate, which is opposite said bonding pad on the one side of said front face of said sensor substrate.

11. A pressure sensor according to claim 2, wherein an adhesion portion between said sensor substrate said package is disposed on a center of said package.

* * * * *